(12) United States Patent
Raij

(10) Patent No.: US 12,379,604 B2
(45) Date of Patent: Aug. 5, 2025

(54) ELECTROMAGNETIC COUPLING SYSTEMS AND METHODS FOR VISUALIZATION DEVICE

(71) Applicant: Universal City Studios LLC, Universal City, CA (US)

(72) Inventor: Andrew Brian Raij, Winter Park, FL (US)

(73) Assignee: Universal City Studios LLC, Universal City, CA (US)

( * ) Notice: Subject to any disclaimer, the term of this patent is extended or adjusted under 35 U.S.C. 154(b) by 152 days.

(21) Appl. No.: 17/331,891

(22) Filed: May 27, 2021

(65) Prior Publication Data

US 2022/0026723 A1 Jan. 27, 2022

Related U.S. Application Data

(60) Provisional application No. 63/056,225, filed on Jul. 24, 2020.

(51) Int. Cl.
*G02B 27/01* (2006.01)
*H01F 7/02* (2006.01)
*H02N 15/00* (2006.01)

(52) U.S. Cl.
CPC ........ *G02B 27/0176* (2013.01); *H01F 7/0242* (2013.01); *H02N 15/00* (2013.01); *G02B 2027/0154* (2013.01)

(58) Field of Classification Search
CPC ............ G02B 2027/0181–0183; G02B 27/0176–0179; H01F 7/0242; H02N 15/00; H05K 5/06
See application file for complete search history.

(56) References Cited

U.S. PATENT DOCUMENTS

| 3,432,749 A | * | 3/1969 | Kohl ........... G01S 3/808 324/76.83 |
| 6,062,688 A | | 5/2000 | Vinas |
| 6,504,528 B1 | * | 1/2003 | Kermani ........... G06F 3/016 345/163 |

(Continued)

FOREIGN PATENT DOCUMENTS

JP 2004282768 A 10/2004

OTHER PUBLICATIONS

PCT/US2021/041293 International Search Report and Written Opinion mailed Nov. 4, 2021.

*Primary Examiner* — William Boddie
*Assistant Examiner* — Bipin Gyawali
(74) *Attorney, Agent, or Firm* — Fletcher Yoder, P.C.

(57) ABSTRACT

An augmented reality, virtual reality, and/or mixed reality (AR/VR) system includes an interface device configured to be worn by a user. The interface device includes a frame supporting a reaction material. The AR/VR system also includes a visualization device configured to display virtual features for visualization by the user. The visualization device includes an electromagnet configured to magnetically couple to the reaction material. The AR/VR system further includes a controller electrically coupled to the electromagnet and configured to adjust operation of the electromagnet to modulate a magnetic coupling force between the electromagnet and the reaction material.

8 Claims, 9 Drawing Sheets

(56) References Cited

U.S. PATENT DOCUMENTS

| | | | |
|---|---|---|---|
| 6,641,485 B1* | 11/2003 | Chauhan | B64G 7/00 |
| | | | 472/60 |
| 9,507,155 B2 | 11/2016 | Morimoto | |
| 9,733,480 B2 | 8/2017 | Baek et al. | |
| 9,753,284 B2 | 9/2017 | Machida et al. | |
| 9,778,467 B1 | 10/2017 | White et al. | |
| 10,018,837 B2 | 7/2018 | Border et al. | |
| 10,239,445 B1* | 3/2019 | Hendricks | G09F 21/04 |
| 10,326,235 B2 | 6/2019 | Devoe | |
| 10,663,737 B1 | 5/2020 | Magrath et al. | |
| 11,200,655 B2 | 12/2021 | Goergen et al. | |
| 11,200,656 B2 | 12/2021 | Goergen et al. | |
| 11,210,772 B2 | 12/2021 | Goergen et al. | |
| 11,774,770 B2* | 10/2023 | Raij | G02B 27/0176 |
| | | | 345/8 |
| 2002/0022496 A1* | 2/2002 | Park | H04M 1/0214 |
| | | | 455/575.3 |
| 2009/0027381 A1* | 1/2009 | Lee | H04N 13/398 |
| | | | 345/204 |
| 2009/0040296 A1* | 2/2009 | Moscato | G02B 27/0176 |
| | | | 348/E13.001 |
| 2009/0209945 A1* | 8/2009 | Lobl | A61M 5/14276 |
| | | | 709/201 |
| 2010/0081377 A1* | 4/2010 | Chatterjee | G06F 1/1632 |
| | | | 455/41.1 |
| 2012/0078035 A1* | 3/2012 | Andersson | H04R 25/606 |
| | | | 600/25 |
| 2014/0313343 A1* | 10/2014 | Frank | H04N 5/33 |
| | | | 348/164 |
| 2016/0083034 A1* | 3/2016 | St-Gallay | B62H 5/001 |
| | | | 224/412 |
| 2017/0090514 A1 | 3/2017 | Byun et al. | |
| 2017/0166221 A1* | 6/2017 | Osterman | A63G 31/00 |
| 2017/0252658 A1* | 9/2017 | Reveley | A63G 31/16 |
| 2017/0323482 A1* | 11/2017 | Coup | H04N 13/383 |
| 2018/0255285 A1* | 9/2018 | Hall | A63G 7/00 |
| 2018/0267635 A1* | 9/2018 | Shida | G06F 1/1626 |
| 2019/0227328 A1 | 7/2019 | Coatney | |
| 2020/0013228 A1* | 1/2020 | Lee | G06T 19/006 |
| 2020/0225715 A1 | 7/2020 | Goergen et al. | |
| 2021/0216099 A1 | 7/2021 | Goodner et al. | |
| 2021/0318545 A1* | 10/2021 | Yamamoto | H04N 5/64 |
| 2021/0351683 A1* | 11/2021 | Zhang | H02K 7/116 |
| 2021/0373346 A1 | 12/2021 | Ninan et al. | |
| 2022/0206592 A1* | 6/2022 | Vanka | G06F 3/038 |

\* cited by examiner

ELECTROMAGNETIC COUPLING SYSTEMS AND METHODS FOR VISUALIZATION DEVICE

CROSS-REFERENCE TO RELATED APPLICATIONS

This application claims priority from and the benefit of U.S. Provisional Application Ser. No. 63/056,225, entitled "ELECTROMAGNETIC COUPLING SYSTEMS AND METHODS FOR VISUALIZATION DEVICE," filed Jul. 24, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include various entertainment attractions that are useful in providing enjoyment to guests. The entertainment attractions of the amusement park may have different themes that are specifically targeted to certain audiences. For example, certain entertainment attractions may include themes that are traditionally of interest to children, while other entertainment attractions may include themes that are traditionally of interest to more mature audiences. It is recognized that it may be desirable to enhance the immersive experience for guests in the entertainment attractions, such as by augmenting the themes with virtual features.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an augmented reality, virtual reality, and/or mixed reality (AR/VR) system includes an interface device configured to be worn by a user. The interface device includes a frame supporting a reaction material. The AR/VR system also includes a visualization device configured to display virtual features for visualization by the user. The visualization device includes an electromagnet configured to magnetically couple to the reaction material. The AR/VR system further includes a controller electrically coupled to the electromagnet and configured to adjust operation of the electromagnet to modulate a magnetic coupling force between the electromagnet and the reaction material.

In one embodiment, a method of operating an augmented reality, virtual reality, and/or mixed reality (AR/VR) system includes generating, via a sensor, feedback indicative of a parameter of a visualization device that is configured to engage with an interface device, where the interface device is configured to be worn by a user. The method also includes monitoring, via a controller, the feedback and adjusting, via the controller, operation of an electromagnet of the visualization device to modulate a magnetic coupling force between the electromagnet and a reaction material of the interface device based on the feedback.

In one embodiment, an augmented reality, virtual reality, and/or mixed reality (AR/VR) system includes a ride vehicle configured to travel along a path. The AR/VR system also includes a visualization device coupled the ride vehicle via a tether and configured to display virtual features for visualization by a user of the visualization device, where the visualization device includes an electromagnet. The AR/VR system includes an interface device configured to be worn by the user and engage with the visualization device, where the interface device includes a frame supporting a reaction material. The AR/VR system further includes a controller electrically coupled to the electromagnet. The electromagnet is configured to magnetically couple to the reaction material and the controller is configured to adjust operation of the electromagnet to modulate a magnetic coupling force between the electromagnet and the reaction material.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
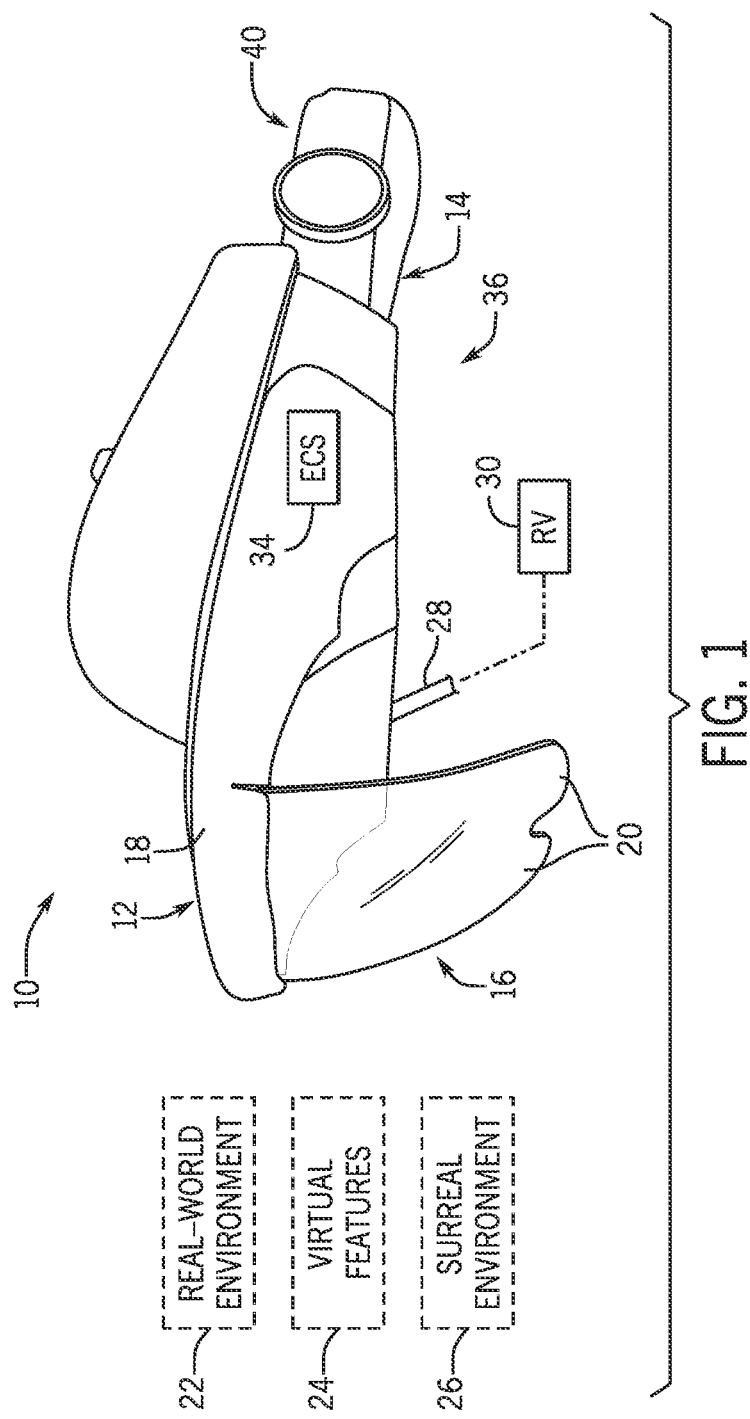
FIG. 1 is a perspective view of a visualization device and an interface device of an augmented reality, virtual reality, and/or mixed reality system (AR/VR system) in an engaged configuration, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (a combination of AR and VR) system (AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive.

The AR/VR system may include a visualization device, such as a head mounted display (e.g., electronic goggles or displays, eyeglasses), which may be configured to enable the guest to view virtual features. For example, the AR/VR system may include a guest interface device, also referred to herein as an interface device, which is configured to removably couple to a head of the guest. The interface device facilitates coupling the visualization device to the guest, such that the guest may wear the visualization device on the head of the guest. The visualization device may be utilized to enhance the guest experience by overlaying the virtual features onto a real-world environment of the amusement park attraction, by providing adjustable virtual features to provide different virtual environments while the guest is in the amusement park attraction, and so forth. Unfortunately, without the disclosed embodiments, it may be difficult and/or time-consuming to quickly and securely attach the visualization device to the interface device (e.g., such as between ride cycles of the amusement park attraction).

Therefore, embodiments of the present disclosure are directed toward an electromagnetic coupling system that enables quick and controllable securement of the visualization device to the interface device. In particular, the electromagnetic coupling system disclosed herein facilitates controllable coupling of the visualization device to, and controllable decoupling of the visualization device from, the interface device. Moreover, the electromagnetic coupling system disclosed herein facilitates retaining the visualization device in an engaged configuration (e.g., a coupled configuration, a locked configuration) with the interface device during certain time periods, such as during a ride cycle of the amusement park attraction.

For example, the electromagnetic coupling system may include one or more electromagnets that are integrated with (e.g., coupled to) the visualization device, the interface device, or both. The electromagnets are configured to selectively engage with (e.g., magnetically couple to) a corresponding reaction material that may be integrated with (e.g., coupled to) the visualization device, the interface device, or both. The reaction material may include one or more strips of metallic material, permanent magnets, other electromagnets, and/or any other suitable magnetically attractable material. As an example, in an embodiment, the electromagnets may be integrated with the visualization device and the reaction material may be integrated with the interface device. As such, the electromagnets may be selectively energized, de-energized, or a have a magnetic polarity reversed to facilitate transitioning the visualization device and the interface device between the engaged configuration in which the electromagnets attract the reaction material, and a detached configuration (e.g., a decoupled or disengaged configuration) in which the electromagnets do not attract the reaction material and/or repel the reaction material. Moreover, as discussed below, a current supplied to the electromagnets may be adjustable (e.g., via a controller) to modulate a magnetic coupling force between the electromagnets and the reaction material and, thus, transiently adjust a coupling strength between the visualization device and the interface device.

In an embodiment, the electromagnets may be electrically coupled to a controller of the AR/VR system and/or to a controller of the amusement park attraction having the AR/VR system. The controller may selectively transition the electromagnets between the energized and de-energized states, may adjust a magnetic coupling force generated by the electromagnets, and/or may adjust a magnetic polarity of the electromagnets to facilitate transitioning the visualization device and the interface device between the engaged and detached configurations. As an example, the controller may transition the electromagnets to and retain the electromagnets in the energized state or a high energy state (e.g., a state in which a magnetic coupling force generated by the electromagnets is relatively high) while the guest uses the visualization device throughout a duration of the ride cycle of the amusement park attraction. As such, the controller may ensure that the visualization device remains engaged or locked with (e.g., coupled to) the interface device during the ride cycle. The controller may transition the electromagnets to the de-energized state or a low energy state (e.g., a state in which a magnetic coupling force generated by the electromagnets is relatively low) while the guest unloads from a ride vehicle of the amusement park attraction, such that the guest deboarding the ride vehicle may remove (e.g., decouple) the visualization device from their respective interface device and leave the visualization device in a storage receptacle of the ride vehicle for a subsequent guest to subsequently use (e.g., on a corresponding interface device of the subsequent guest boarding the ride vehicle).

In an embodiment, the controller may adjust operation of the electromagnets in coordination with events of the ride cycle (e.g., based on ride data). For example, the controller may adjust operation of the electromagnets during various time periods throughout the ride cycle and/or between the ride cycles of the amusement park attraction to vary a magnetic coupling force (e.g., an attractive force) generated by the electromagnets (e.g., between electromagnets and the reaction material). As discussed in detail herein, in this manner, the controller may enable the electromagnets to assist the guest in coupling the visualization device to the interface device and/or assist the guest in decoupling the visualization device from the interface device, such as when the guest boards and deboards the ride vehicle between ride cycles of the amusement park attraction. Additionally or alternatively, the controller may vary the coupling force provided by the electromagnets based on sensor feedback acquired by one or more sensors, such as one or more sensors of the visualization device and/or the amusement park attraction, to ensure that the visualization device remains fixedly coupled to the interface device of the guest throughout the duration of the ride cycle. These and other features will be described below with reference to the drawings.

With the foregoing in mind, FIG. 1 is a perspective view an embodiment of an AR/VR system 10 (e.g., a wearable visualization system) configured to enable a user (e.g., a guest, an amusement park employee, a passenger of a ride vehicle) to experience (e.g., view, interact with) AR/VR scenes. The AR/VR system 10 includes a visualization device 12 (e.g., a head mounted display, a wearable visualization device) and an interface device 14 that are removably coupleable to one another to facilitate usage of the AR/VR system 10.

In the illustrated embodiment, the visualization device 12 includes electronic eyeglasses 16 (e.g., AR/VR eyeglasses, goggles) that are coupled to a housing 18 of the visualization device 12. The electronic eyeglasses 16 may include one or more displays 20 (e.g., transparent, semi-transparent, opaque). In an embodiment, the displays 20 may enable the user to view a real-world environment 22 (e.g., physical structures in the attraction) through the displays 20 with certain virtual features 24 (e.g., AR features) overlaid onto the displays 20 so that the user perceives the virtual features 24 as being integrated into the real-world environment 22. That is, the electronic eyeglasses 16 may at least partially control a view of the user by overlaying the virtual features 24 onto a line of sight of the user. To this end, the visualization device 12 may enable the user to visualize and perceive a surreal environment 26 (e.g., a game environment) having certain virtual features 24 overlaid onto the real-world environment 22 viewable by the user through the displays 20. By way of non-limiting example, the displays 20 may include transparent (e.g., see-through) light emitting diode (LED) displays or transparent (e.g., see-through) organic light emitting diode (OLED) displays.

In an embodiment, the visualization device 12 may completely control the view of the user (e.g., using opaque viewing surfaces). That is, the displays 20 may include opaque or non-transparent displays configured to display the virtual features 24 (e.g., VR features) to the user. As such, the surreal environment 26 viewable by the user may be, for example, a real-time video that includes real-world images of the physical, real-world environment 22 electronically merged with one or more virtual features 24. Thus, in wearing the visualization device 12, the user may feel completely encompassed by the surreal environment 26 and may perceive the surreal environment 26 to be the real-world environment 22 that includes certain virtual features 24. In an embodiment, the visualization device 12 may include features, such as light projection features, configured to project light into one or both eyes of the user so that certain virtual features 24 are superimposed over real-world objects viewable by the user. Such a visualization device 12 may be considered to include a retinal display.

As such, it should be appreciated that the surreal environment 26 may include an AR experience, a VR experience, a mixed reality experience, a computer-mediated reality experience, a combination thereof, or other similar surreal environment. Moreover, it should be understood that the visualization device 12 may be used alone or in combination with other features to create the surreal environment 26. Indeed, as discussed below, the user may wear the visualization device 12 throughout a duration of a ride of an amusement park ride or during another time, such as during a game, throughout a particular area or attraction of an amusement park, during a ride to a hotel associated with the amusement park, at the hotel, and so forth. In an embodiment, when implemented in the amusement park setting, the visualization device 12 may be physically coupled to (e.g., tethered via a cable 28 or tether) to a structure (e.g., a ride vehicle 30 of the amusement park ride) to block separation of the visualization device 12 from the structure and/or may be electronically coupled to (e.g., via the cable 28) to a computing system (e.g., a computing system integrated with the ride vehicle 30) to facilitate operation of the visualization device 12 (e.g., display of the virtual features 24).

As discussed in detail below, the visualization device 12 is removably coupleable (e.g., toollessly coupleable; coupleable without tools; coupled without threaded fasteners, such as bolts; separable without tools and without breaking the components of the visualization device 12 or the interface device 14) to the interface device 14 via an electromagnetic coupling system 34. The electromagnetic coupling system 34 may be integrated with the visualization device 12 and the interface device 14. The electromagnetic coupling system 34 enables the visualization device 12 to quickly transition between an engaged configuration 36, in which the visualization device 12 is coupled to the interface device 14, and a detached configuration 38 (see, e.g., FIG. 2), in which the visualization device 12 is decoupled from the interface device 14.

The interface device 14 is configured to be affixed to a head of the user and, thus, enable the user to comfortably wear the visualization device 12 throughout various attractions or while traversing certain amusement park environments. For example, the interface device 14 may include a head strap assembly 40 that is configured to span about a circumference of the head of the user and configured to be tightened (e.g., constricted) on the head of the user. In this manner, the head strap assembly 40 facilitates affixing the interface device 14 to the head of the user, such that the interface device 14 may be utilized in conjunction with the electromagnetic coupling system 34 to retain the visualization device 12 on the user (e.g., when the visualization device 12 is in the engaged configuration 36). It should be understood that the visualization device 12 may have a size and weight that enables the visualization device 12 to be comfortably worn (e.g., supported by) by the user.

Figure 3:
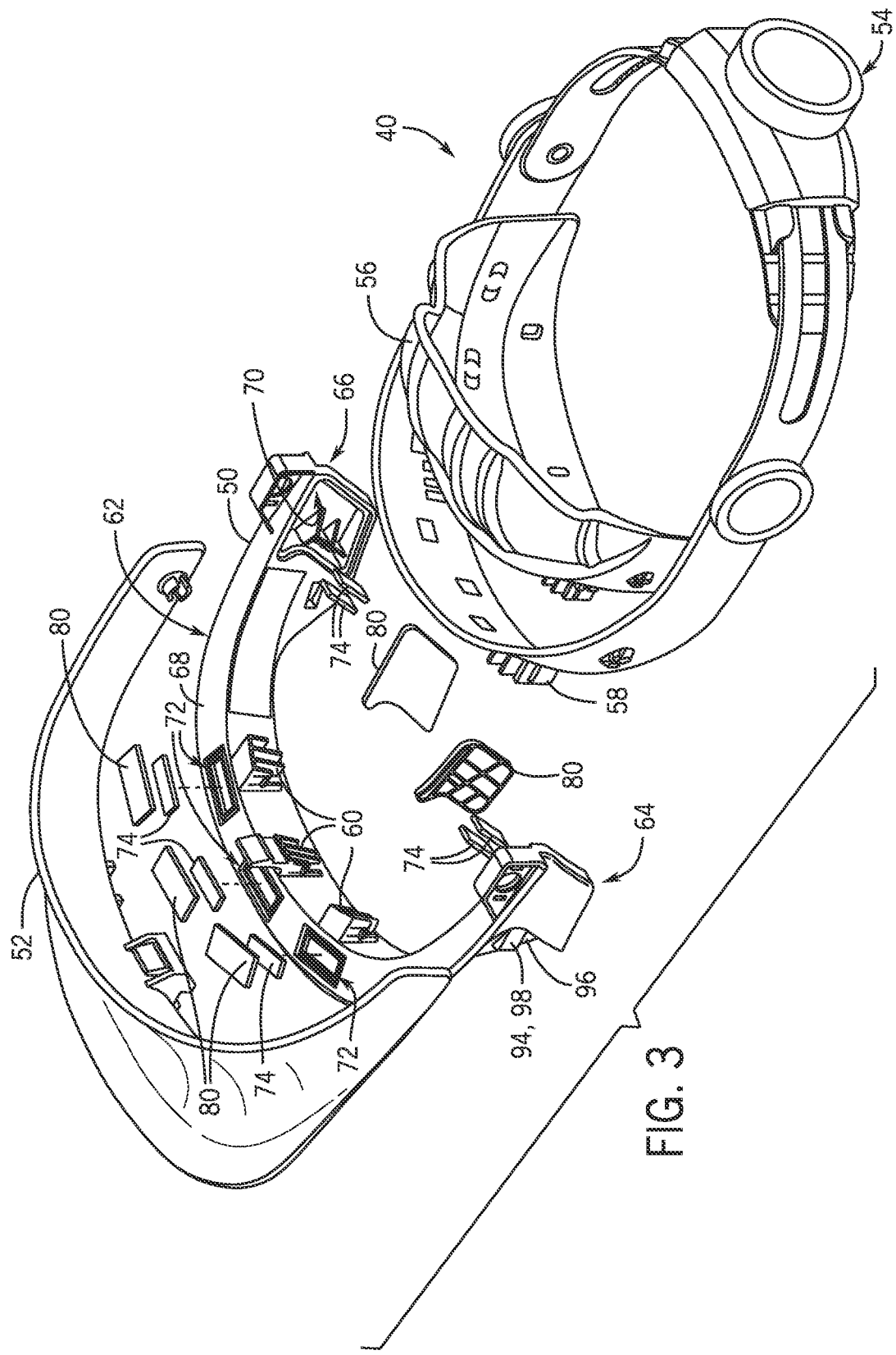
FIG. 3 is a partial exploded view of the interface device of FIG. 1, in accordance with present embodiments.

To better illustrate the interface device 14 and to facilitate the following discussion, FIG. 3 is a partial exploded view of an embodiment of the interface device 14. As shown in the illustrated embodiment, the interface device 14 includes an interface frame 50 and a visor 52 that may be coupled to the interface frame 50. The head strap assembly 40 may include an adjustment assembly 54 for adjusting an inner circumference of the head strap assembly 40 to accommodate head parameters (e.g., head sizes, head shapes, hair styles) of a variety of users to facilitate coupling the interface device 14 to the respective heads of the users. In an embodiment, the head strap assembly 40 includes a mask 56 that is configured to contact a forehead of the head of the user to facilitate alignment and/or securement of the interface device 14 to the head of the user. The head strap assembly 40 includes one or more first attachment features 58 configured to engage with respective second attachment features 60 of the interface frame 50. As such, engagement of the first and second attachment features 58, 60 enables the head strap assembly 40 to be coupled to the interface frame 50.

In the illustrated embodiment, the interface frame 50 includes a body portion 62 having a first peripheral end 64 (e.g., end portion; lateral portion), a second peripheral end 66 (e.g., end portion; lateral portion) opposite to the first peripheral end 64, and a lip 68 extending between the first and second peripheral ends 64, 66. The body portion 62 may include peripheral cavities 70 or pockets that are formed within the first and second peripheral ends 64, 66 and/or one or more cavities 72 or pockets that are formed within the lip 68. In an embodiment, the electromagnetic coupling system 34 includes one or more reaction plates 74 (e.g., one or more reaction materials), which may be configured to be disposed within respective cavities 70, 72. As discussed in detail below, the reaction plates 74 are configured to magnetically couple with corresponding electromagnets included in the visualization device 12 to facilitate removable coupling of the interface device 14 to the visualization device 12. The reaction plates 74 may include any suitable ferrous material or materials (e.g., one or more iron plates, one or more metallic plates). Additionally or alternatively, the reaction plates 74 may include electromagnets or permanent magnets (e.g., neodymium magnets).

In an embodiment, respective caps 80 may be disposed over the reaction plates 74 to encapsulate the reaction plates 74 within the respective cavities 70, 72. Particularly, the caps 80 may be coupled to the interface frame 50 via, for example, suitable adhesives or an ultrasonic welding process. In this manner, in an installed configuration, the caps 80 may hermetically seal the reaction plates 74 within the respective cavities 70, 72 to substantially block contaminants (e.g., water) from entering the cavities 70, 72 and/or accumulating within the cavities 70, 72. It should be appreciated that the cavities 70, 72 may be formed within any suitable portion of the interface device 14 and/or the reaction plates 74 may be coupled to and/or integrated with any suitable portion of the interface device 14.

In an embodiment, the body portion 62 includes a plurality of support ribs 94 that protrude from an outer surface 96 of the body portion 62. Particularly, the body portion 62 may include a first support rib 98 that extends from the first peripheral end 64 and a second support rib that extends from the second peripheral end 66. As discussed in detail below, the support ribs 94 are configured to engage with corresponding support grooves 100 (see, e.g., FIG. 4) formed within the housing 18 of the visualization device 12 to facilitate coupling of the visualization device 12 to the interface frame 50 of the interface device 14. Thus, the support ribs 94 and the support grooves 100 may also form a portion of the electromagnetic coupling system 34. It should be appreciated that, in other embodiments, the electromagnetic coupling system 34 may not include the support ribs 94 and the support grooves 100.

Figure 4:
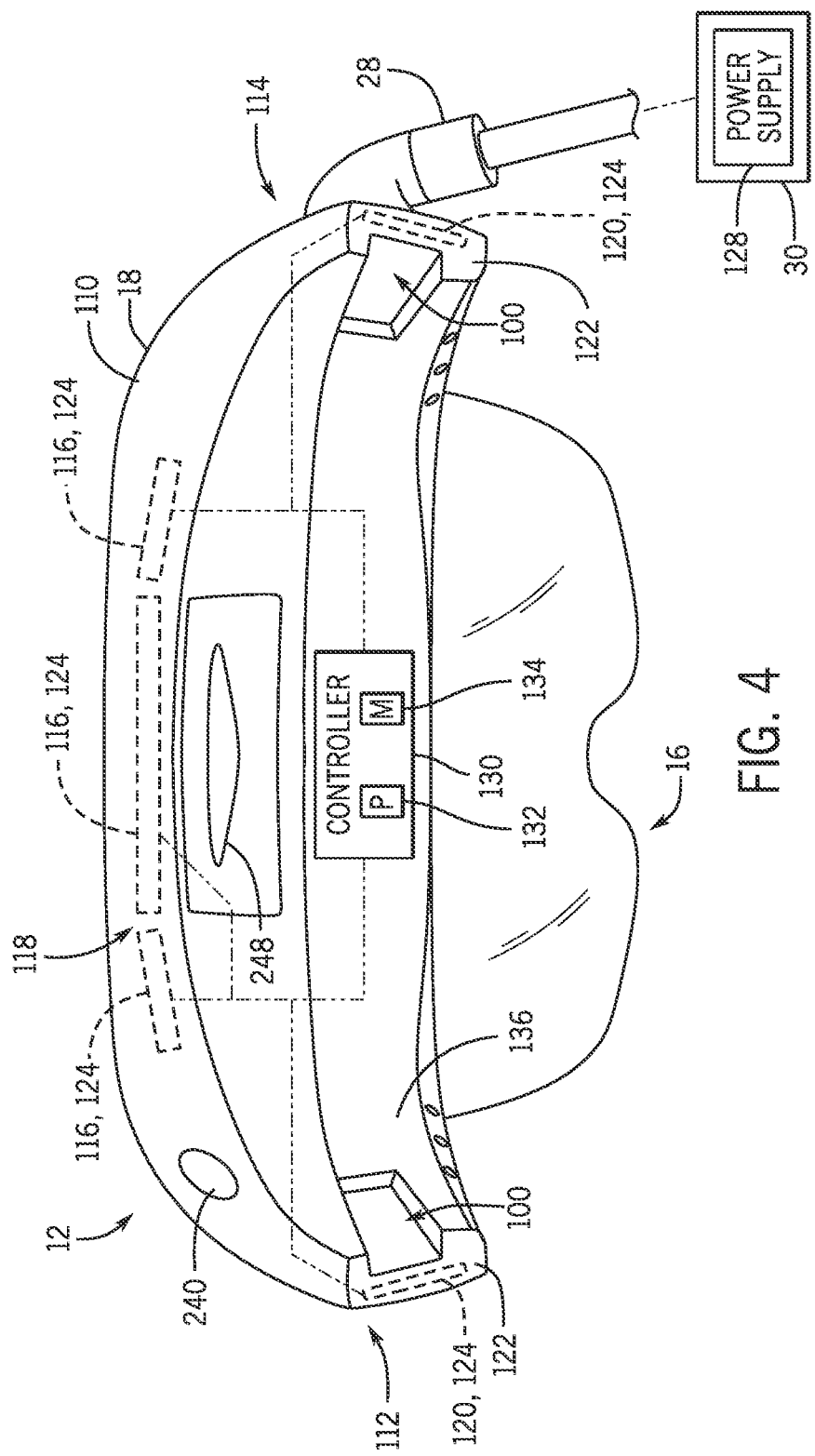
FIG. 4 is a rear view of the visualization device of FIG. 1, in accordance with present embodiments.

FIG. 4 is a rear view of an embodiment of the visualization device 12. In the illustrated embodiment, the housing 18 includes a panel 110 that extends between a first peripheral portion 112 (e.g., end portion; lateral portion) and a second peripheral portion 114 (e.g., end portion; lateral portion) of the housing 18. The electromagnetic coupling system 34 may include one or more first electromagnets 116 that are positioned near a surface 118 of the panel 110 and/or one or more second electromagnets 120 that are positioned near respective surfaces 122 of the first and second peripheral portions 112, 114. For example, in an embodiment, the first electromagnets 116 may be hermetically sealed within respective cavities formed within the surface 118, while the second electromagnets 120 may be hermetically sealed within respective cavities formed within the surfaces 122. In other embodiments, the first and second electromagnets 116, 120 (collectively referred to herein as electromagnets 124) may be positioned within an interior of the housing 18 and disposed adjacent the surface 118 and the surfaces 122, respectively. In any case, as discussed in detail below, the electromagnets 124 are configured to selectively attract corresponding reaction plates 74 of the interface device 14 to facilitate magnetically coupling the visualization device 12 to the interface device 14. In an embodiment, certain of the electromagnets 124 may be replaced with permanent magnets or a suitable reaction material (e.g., metallic plate).

The electromagnets 124 may be electrically coupled (e.g., via the cable 28) to a power supply 128 configured to provide the electromagnets 124 with electrical power (e.g., electrical current). In an embodiment, the power supply 128 may be coupled to and configured to travel with the ride vehicle 30 (e.g., along a track of the attraction). In other embodiments, the power supply 128 may include a battery or other device that is integrated with the visualization device 12 and configured to provide the electromagnets 124 with electrical power suitable for enabling operation of the electromagnets 124.

In the illustrated embodiment, the visualization device 12 includes a controller 130 that is electrically coupled to the power supply 128. The controller 130 is configured to operate the electromagnetic coupling system 34 in accordance with the techniques discussed herein. The controller 130 includes a processor 132 and a memory device 134. The processor 132 may include a microprocessor, which may execute software controlling the visualization device 12, the electromagnetic coupling system 34, and/or any other suitable components of the AR/VR system 10 and/or components of the attraction having the AR/VR system 10. The processor 132 may include multiple microprocessors, one or more "general-purpose" microprocessors, one or more special-purpose microprocessors, and/or one or more application specific integrated circuits (ASICs), or some combination thereof. For example, the processor 132 may include one or more reduced instruction set computer (RISC) processors. The memory device 134 may include volatile memory, such as random access memory (RAM), and/or nonvolatile memory, such as read-only memory (ROM). The memory device 134 may store information, such as control software, look up tables, configuration data, communication protocols, or the like.

For example, the memory device 134 may store processor-executable instructions including firmware or software for the processor 132 to execute, such as instructions for controlling components of the electromagnetic coupling system 34, components of the visualization device 12, components of the AR/VR system 10, and/or any suitable components of the attraction having the AR/VR system 10. In an embodiment, the memory device 134 is a tangible, non-transitory, machine-readable media that may store machine-readable instructions for the processor 132 to execute. The memory device 134 may include ROM, flash memory, hard drives, any other suitable optical, magnetic, or solid-state storage media, or a combination thereof.

In the illustrated embodiment of FIG. 4, the support grooves 100 that are formed within the peripheral portions 112, 114 of the housing 18 extend along at least a portion of a lateral surface 136 of the housing 18. For example, the support grooves 100 may extend from the surfaces 122 (e.g., distal ends of the housing 18) generally toward the electronic eyeglasses 16. As discussed below, the support grooves 100 may be configured to engage with corresponding ones of the support ribs 94 to facilitate removably coupling the visualization device 12 to the interface device 14.

Figure 5:
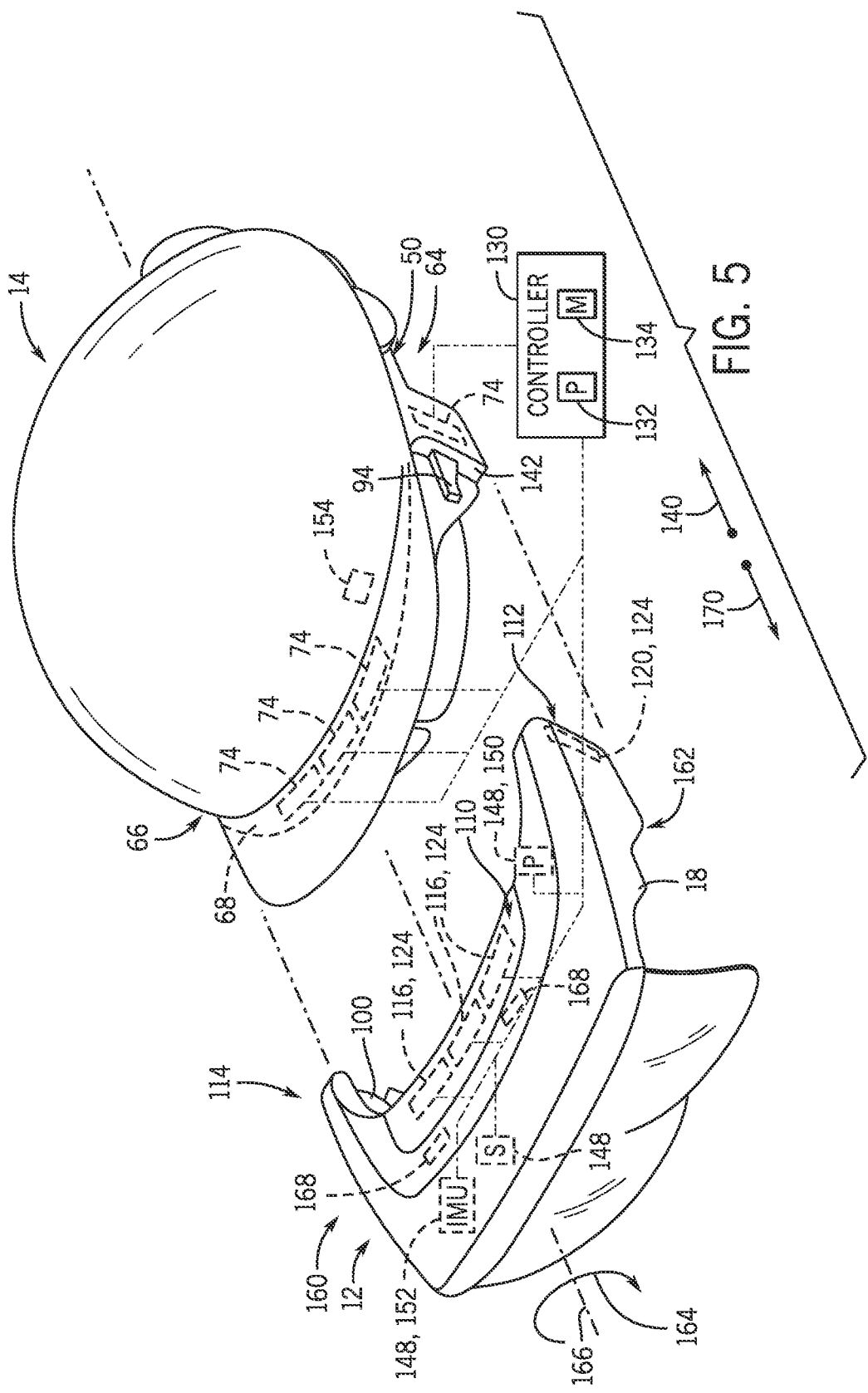
FIG. 5 is a perspective view of the visualization device of FIG. 1 and a helmet-style interface device in a detached configuration, in accordance with present embodiments.

FIG. 5 is a perspective view of an embodiment of the visualization device 12 and the interface device 14. It should be noted that FIG. 5 illustrates a different structure for the interface device 14 (e.g., a helmet-style, compared to a visor-style shown in FIGS. 1-3), as various different structures for the interface device 14 are envisioned. To couple the visualization device 12 to the interface device 14, the user may (e.g., while holding the interface device 14 in the user's hands and while the interface device 14 is separated from the user's head; while wearing the interface device 14 on the user's head) translate the visualization device 12 toward the interface device 14 in a direction 140 to enable the support ribs 94 of the interface device 14 to engage with the corresponding support grooves 100 of the visualization device 12. The user may translate the visualization device 12 along the support ribs 94 (e.g., in the direction 140) until the surfaces 122 of the housing 18 abut corresponding receiving faces 142 of the first and second peripheral ends 64, 66 of the interface frame 50. As such, the second electromagnets 120 may be aligned with and positioned adjacent to the corresponding reaction plates 74 of the interface frame 50. Additionally or alternatively, at least a portion of the panel 110 of the visualization device 12 may be configured to translate beneath and along the lip 68 of the interface frame 50 to enable the first electromagnets 116 of the visualization device 12 to align with the corresponding reaction plates 74. The controller 130 may selectively supply electrical power (e.g., via the power supply 128) to the electromagnets 124 to energize the electromagnets 124 to magnetically couple the electromagnets 124 to the reaction plates 74. As such, the controller 130 may facilitate transitioning the visualization device 12 and the interface device 14 to the engaged configuration 36.

For example, in an embodiment, the controller 130 may be communicatively coupled to one or more sensors 148 (e.g., a proximity sensor 150, an inertial measurement unit [IMU] 152) that are integrated with the visualization device 12 and configured to provide the controller 130 with feedback indicative of a position of the visualization device 12 relative to the interface device 14 and/or an orientation of the visualization device 12 relative to the interface device 14. In particular, the sensors 148 may provide the controller 130 with feedback indicative of a position and/or an orientation of the visualization device 12 relative to a surface of the interface device 14, such as one of the receiving faces 142. Additionally or alternatively, the sensors 148 may provide the controller 130 with feedback indicative of a position and/or an orientation of the visualization device 12 relative to a reference structure 154 (e.g., a metallic chip, a radiofrequency identification [RFID] tag) that may be embedded in or otherwise coupled to the interface device 14.

In any case, the controller 130 may be configured to energize the electromagnets 124, de-energize the electromagnets 124, adjust a magnetic polarity of the electromagnets 124, or otherwise adjust a magnetic coupling force generated by the electromagnets 124 (e.g., increase or decrease a magnetic coupling force generated by the electromagnets 124) based on the feedback provided by the sensors 148. For clarity, it should be understood that the controller 130 may adjust the magnetic coupling force generated by the electromagnets 124 by adjusting a current supplied to the electromagnets 124 via the power supply 128. That is, in an embodiment, the controller 130 may increase the magnetic coupling force generated by the electromagnets 124 by increasing a magnitude of an electrical current supplied to the electromagnets 124 and may decrease the magnetic coupling force generated by the electromagnets by decreasing the magnitude of the electrical current supplied to the electromagnets 124.

In an embodiment, the controller 130 may be configured to continuously or intermittently monitor (e.g., based on the feedback from the sensors 148) the position and/or the orientation of the visualization device 12 (e.g., relative to the interface device 14). The controller 130 may energize the electromagnets 124 upon determining that the visualization device 12 is within a threshold distance of the interface device 14 and/or upon determining that the visualization device 12 is oriented within a threshold orientational range relative to the interface device 14. As an example, the controller 130 may energize the electromagnets 124 upon a determination that the support grooves 100 are substantially adjacent (e.g., positioned within a threshold distance of) the corresponding support ribs 94 and/or that the support grooves 100 are substantially aligned (e.g., oriented within a threshold angle relative to, such as within 5 degrees of) the support ribs 94. In this manner, the electromagnets 124 may attract the reaction plates 74 when the visualization device 12 is appropriately aligned and positioned relative to the interface device 14 to draw the visualization device 12 toward the interface device 14 and engage the support grooves 100 with the support ribs 94. As such, the controller 130 may operate the electromagnets 124 to facilitate quick and proper engagement of the visualization device 12 and the interface device 14 (e.g., to pull the visualization device 12 and the interface device 14 together). In an embodiment, by maintaining the electromagnets 124 in a de-energized state or a low power state (e.g., a state in which the magnetic strength output by the electromagnets is relatively low) while the visualization device 12 is separated from the interface device 14 (e.g., separated from the interface device 14 by the threshold distance) and/or misaligned with the interface device 14 (e.g., not oriented within the threshold angle), the controller 130 may ensure that the electromagnets 124 do not attract or magnetically couple to the interface device 14 in an improper manner and/or do not attract or magnetically couple to foreign objects, such as jewelry or other metallic objects that may be worn by a guest utilizing the AR/VR system 10. In an embodiment, the controller 130 may be configured to selectively energize, de-energize, and/or change a polarity of certain of the electromagnets 124 to assist the user in transitioning the visualization device 12 to the engaged configuration 36 on the interface device 14.

The controller 130 may be configured to determine (e.g., based on feedback from the sensors 148) whether the visualization device 12 is misaligned relative to the interface device 14 during the user's attempt to couple the visualization device 12 to the interface device 14. Upon determining that the visualization device 12 is misaligned relative to the interface device 14, the controller 130 may energize, de-energize, and/or change a polarity of certain of the electromagnets 124 (e.g., a subset, only some) to facilitate appropriate alignment. For example, the controller 130 may energize one or more of the electromagnets 124 and de-energize one or more of the electromagnets 124. In particular, the controller 130 may energize one or more of the electromagnets 124 positioned near a first lateral end 160 of the visualization device 12 to a first polarity and may de-energize one or more of the electromagnets 124 positioned near a second lateral end 162 of the visualization device 12 or may energize the one or more electromagnets 124 near the second lateral end 162 to a second polarity, opposite the first polarity. The electromagnets 124 may thus interact with the reaction plates 74 of the interface device 14 to impart a torque 164 about a longitudinal axis 166 of the visualization device 12. The torque 164 may cause the visualization device 12 to twist or pivot about the axis 166 (e.g., while the user holds the visualization device 12) to align the visualization device 12 with the interface device 14 (e.g., to align the support grooves 100 with the support ribs 94). Once the visualization device 12 is aligned with the interface device 14 (e.g., once the support grooves 100 are aligned with the support ribs 94), the controller 130 may energize the electromagnets 124 to attract the corresponding reaction plates 74 to transition the visualization device 12 to the engaged configuration 36 on the interface device 14. In this manner, the controller 130 may assist the user in coupling the visualization device 12 to the interface device 14.

It should be understood that the controller 130 may adjust operation of any of the electromagnets 124 to facilitate proper alignment of the visualization device 12 with the interface device 14, particularly when the user attempts to couple the visualization device 12 to the interface device 14. That is, the controller 130 may adjust operation of the electromagnets 124 to induce axial shifting (e.g., along the axis 166) and/or lateral shifting (e.g., perpendicular to the axis 166) of the visualization device 12 relative to the interface device 14. Additionally or alternatively, the controller 130 may adjust operation of the electromagnets 124 to induce pivotal motion of the visualization device 12 relative to the interface device 14 (e.g., about the axis 166 and/or about another suitable axis). Such movement or shifting may be based on and in response to feedback from the sensors 148.

As discussed above, in an embodiment, the visualization device 12 may include one or more permanent magnets 168 (e.g., neodymium magnets). The permanent magnets 168 may be configured to engage with corresponding reaction plates 74 of the interface device 14 when the user transitions the visualization device 12 from the disengaged configuration 38 to the engaged configuration 36, even while the electromagnets 124 are initially de-energized, for example. Upon a determination that the visualization device 12 is engaged with the interface device 14 (e.g., via feedback from the sensors 148), the controller 130 may be configured to energize the electromagnets 124 to further enhance a coupling strength (e.g., via a combination of the permanent magnets 168 and the electromagnets 124) between the visualization device 12 and the interface device 14.

To remove the visualization device 12 from the interface device 14, the user may translate the visualization device 12 away from the interface device 14 in a direction 170, generally opposite to the direction 140, to magnetically decouple the electromagnets 124 from the reaction plates 74 of the visualization device 12. The user may continue to translate the visualization device 12 in the direction 170, relative to the interface device 14, to remove (e.g., decouple) the visualization device 12 from the interface device 14. In an embodiment, the controller 130 may be configured to determine when the user is attempting to remove the visualization device 12 from the interface device 14 and, upon such determination, may adjust operation of the electromagnets 124 to facilitate decoupling of the visualization device 12 and the interface device 14. For example, when the visualization device 12 is coupled to the interface device 14, the controller 130 may be configured to monitor a load applied to the visualization device 12 (e.g., in the direction 170) based on a current being drawn by and/or a voltage supplied to the electromagnets 124. As an example, a current drawn by the electromagnets 124 may increase or decrease when the user attempts to magnetically decouple the electromagnets 124 from the reaction plates 74 while the electromagnets 124 are energized. The controller 130 may determine that the user is attempting to decouple the visualization device 12 from the interface device 14 when the load exceeds a threshold value for a predetermined amount of time (e.g., 0.5 second, 1 second). Upon determining that the user is attempting to decouple the visualization device 12 from the interface device 14, the controller 130 may transition the electromagnets 124 to a de-energized state (e.g., reduce the current supplied to the electromagnets 124) to substantially reduce or eliminate the magnetic coupling force between the electromagnets 124 and the reaction plates 74. Additionally or alternatively, the controller 130 may reverse a polarity of certain of the electromagnets 124 to cause these electromagnets 124 to repel the reaction plates 74 (e.g., permanent magnets) of the interface device 14. To this end, the controller 130 may assist the user in removing and/or decoupling the visualization device 12 from the interface device 14.

It should be appreciated that, in an embodiment, the support grooves 100 and the support ribs 94 may be omitted from the AR/VR system 10. In such embodiments, the magnetic coupling force between the electromagnets 124 and the reaction plates 74 may be sufficient to support all of a weight of the visualization device 12 when the visualization device 12 is coupled to the interface device 14 and/or other structural features may be provided to share support of the weight of the visualization device 12 when the visualization device 12 is coupled to the interface device 14.

Figure 6:
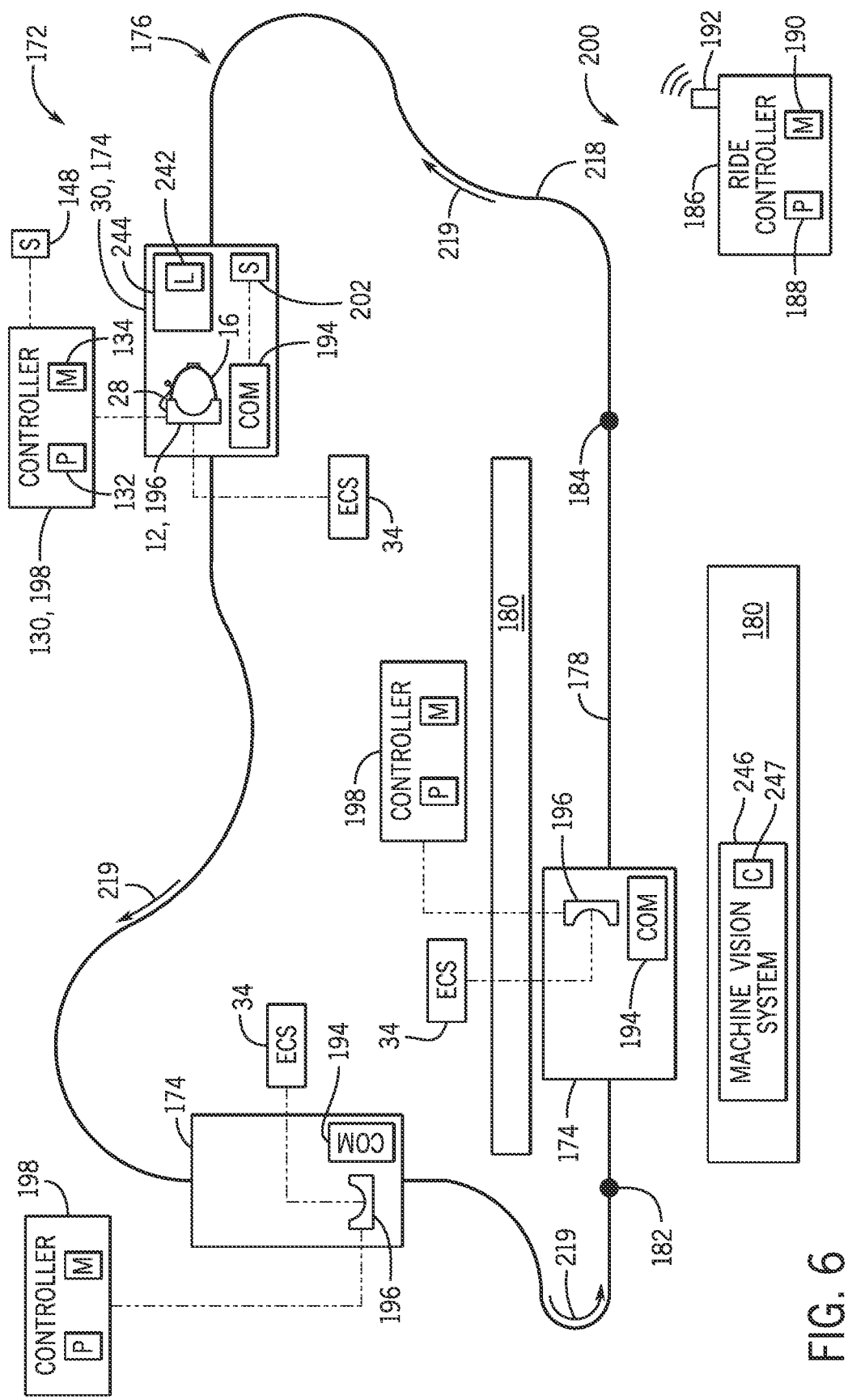
FIG. 6 is a schematic of an attraction utilizing the AR/VR system of FIG. 1, in accordance with present embodiments.

FIG. 6 is a schematic of an embodiment of an attraction 172 utilizing the AR/VR system 10. In the illustrated embodiment, the attraction 172 includes a plurality of ride vehicles 174, which includes the ride vehicle 30. It should be appreciated that each of the ride vehicles 174 may include some of or all of the features of the ride vehicle 30 discussed herein. The ride vehicles 174 are configured to travel along a track or a path 176 of the attraction 172, although the AR/VR system 10 may be utilized with ride vehicles that move without traveling along a track or a path or in of a variety of other types of attractions. As shown, the path 176 may include a loading section 178 that extends along a station or platform 180 of the attraction 172. Particularly, the loading section 178 may extend along the platform 180 from an entrance point 182 to an exit point 184. The platform 180 may facilitate loading and/or unloading of users (e.g., riders) into and out of the ride vehicles 174.

In the illustrated embodiment, the attraction 172 includes a ride controller 186 having a processor 188, a memory 190, and a communication component 192. The ride controller 186 may monitor and/or control certain aspects of the attraction 172, such as the respective positions of the ride vehicles 174 along the path 176. The ride controller 186 may be communicatively coupled (e.g., via the communication component 192) to respective communication components 194 of the ride vehicles 174 to enable transmission of sensor feedback and/or control signals between the ride controller 186 and various components of the ride vehicles 174. For example, each of the ride vehicles 174 may include one or more visualization devices 196 having respective controllers 198 that may be communicatively coupled to the ride controller 186 (e.g., via the communication components 194, to receive ride data). To this end, the ride controller 186 may be used in addition to, or in lieu of, the controllers 198 to adjust operation of the visualization devices 196 and/or the corresponding electromagnetic coupling systems 34 in accordance with the techniques discussed herein.

Throughout the following discussion, the controller 130 and the ride controller 186 may be collectively referred to as a control system 200. Accordingly, it should be understood that operations discussed herein as being performed by the control system 200 may refer to operations that are performed by one or more of the controllers 198, the ride controller 186, or both. For clarity, as used herein, the control system 200 may thus be indicative of the controller 130, the ride controller 186, or both the controller 130 and the ride controller 186. Furthermore, it should be appreciated that the techniques may be distributed between the one or more controllers 198, the ride controller 186, and/or one or more other processing devices in any suitable manner.

The processor 188 may include multiple microprocessors, one or more "general-purpose" microprocessors, one or more special-purpose microprocessors, and/or one or more application specific integrated circuits (ASICs), or some combination thereof. For example, the processor 188 may include one or more reduced instruction set computer (RISC) processors. The memory device 190 may include volatile memory, such as random access memory (RAM), and/or nonvolatile memory, such as read-only memory (ROM). In an embodiment, the memory device 190 is a tangible, non-transitory, machine-readable media that may store machine-readable instructions for the processor 188 to execute to control aspects of the attraction 172.

In an embodiment, the control system 200 may be configured to adjust operation of the electromagnetic coupling system 34 based on ride data, including a location of the ride vehicle 30 along the path 176. The control system 200 may determine the location of the ride vehicle 30 based on feedback from the one or more sensors 148 of the visualization device 12, from one or more sensors 202 (e.g., global positioning system [GPS] sensors) integrated with the ride vehicle 30, from one or more sensors (e.g., proximity sensors) positioned along the path 176, and/or via other suitable techniques (e.g. the ride data may include timing signals indicative of a time at which the ride vehicle 30 will reach certain points along the path 176 during a ride cycle between departing from the loading section 178 and reaching an unloading section, which may be the loading section 178 or at some other location along the path 176).

Figure 7:
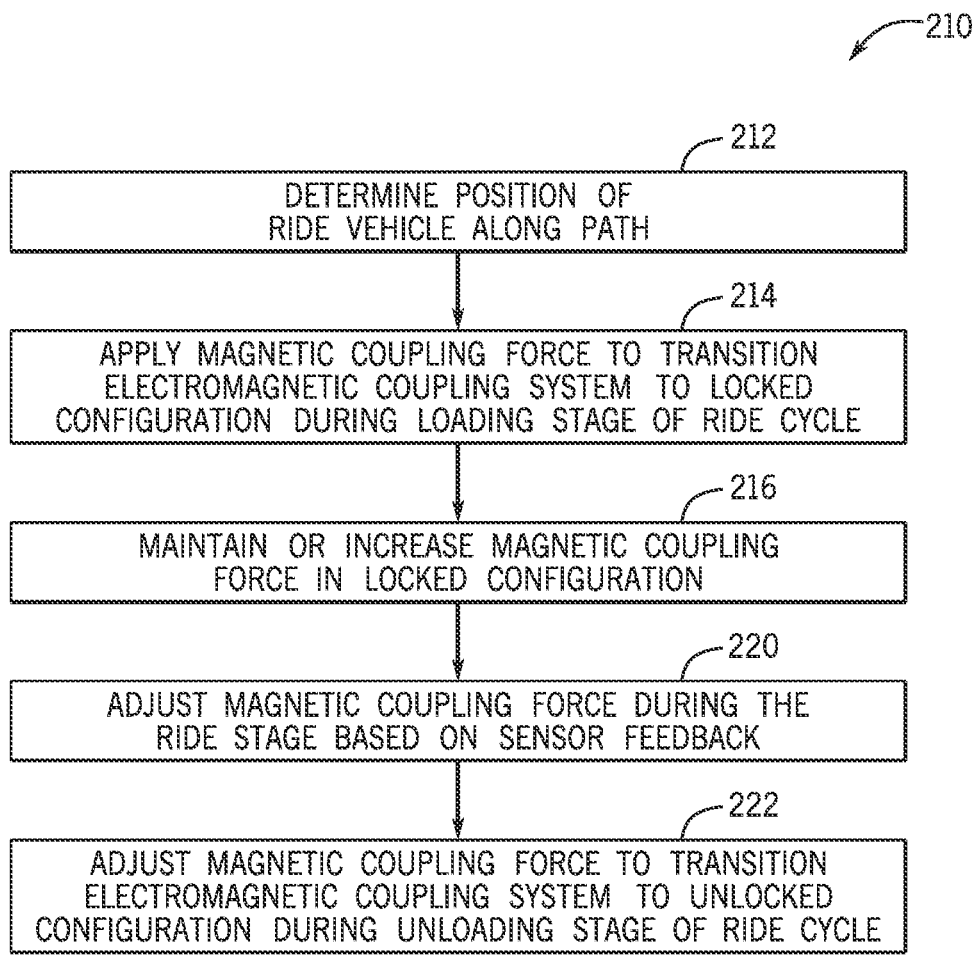
FIG. 7 is a flow diagram of a process for operating the AR/VR system based on a location of a ride vehicle of the attraction of FIG. 6, in accordance with present embodiments.

FIG. 7 is a flow diagram of an embodiment of a process 210 for operating the electromagnetic coupling system 34 in a coordinated manner with the ride cycle and/or based on a position of the ride vehicle 30 along the path 176 (e.g., based on ride data). The process 210 may be executed by the control system 200. The process 210 may include receiving an indication of and determining a position of the ride vehicle 30 along the path 176, as indicated by block 212. In particular, the process 210 may include determining whether the ride vehicle 30 is positioned along the loading section 178 of the path 176.

Upon determining that the ride vehicle 30 is positioned along the loading section 178 (e.g., during loading/unloading of users to and from the ride vehicle 30), the control system 200 may operate the electromagnetic coupling system 34 in accordance with the techniques discussed herein to facilitate coupling the visualization device 12 to, and decoupling of the visualization device 12 from, the interface device 14 of a corresponding user. In particular, during a loading stage, the control system 200 may operate the electromagnets 124 to selectively engage (e.g., magnetically engage) the reaction plates 74 to facilitate transitioning the electromagnetic coupling system 34 to the locked configuration, to thereby transition the visualization device 12 to the engaged configuration 36 with the interface device 14, as indicated by block 214.

That is, upon determining that the ride vehicle 30 is in the loading section 178 and is within the loading stage or portion of the ride cycle (e.g., a previous ride cycle is complete, previous users have removed and stored their respective visualization device 12, previous users have deboarded, and subsequent users have boarded), the control system 200 may operate the electromagnets 124 to selectively engage the reaction plates 74 to facilitate transitioning the electromagnetic coupling system 34 to the locked configuration. The control system 200 may operate the electromagnets 124 to selectively engage the reaction plates 74 to facilitate transitioning the electromagnetic coupling system 34 to the locked configuration in response to feedback from the one or more sensors 148, such as feedback that indicates that the user has positioned the visualization device 12 near the interface device 14.

Figure 2:
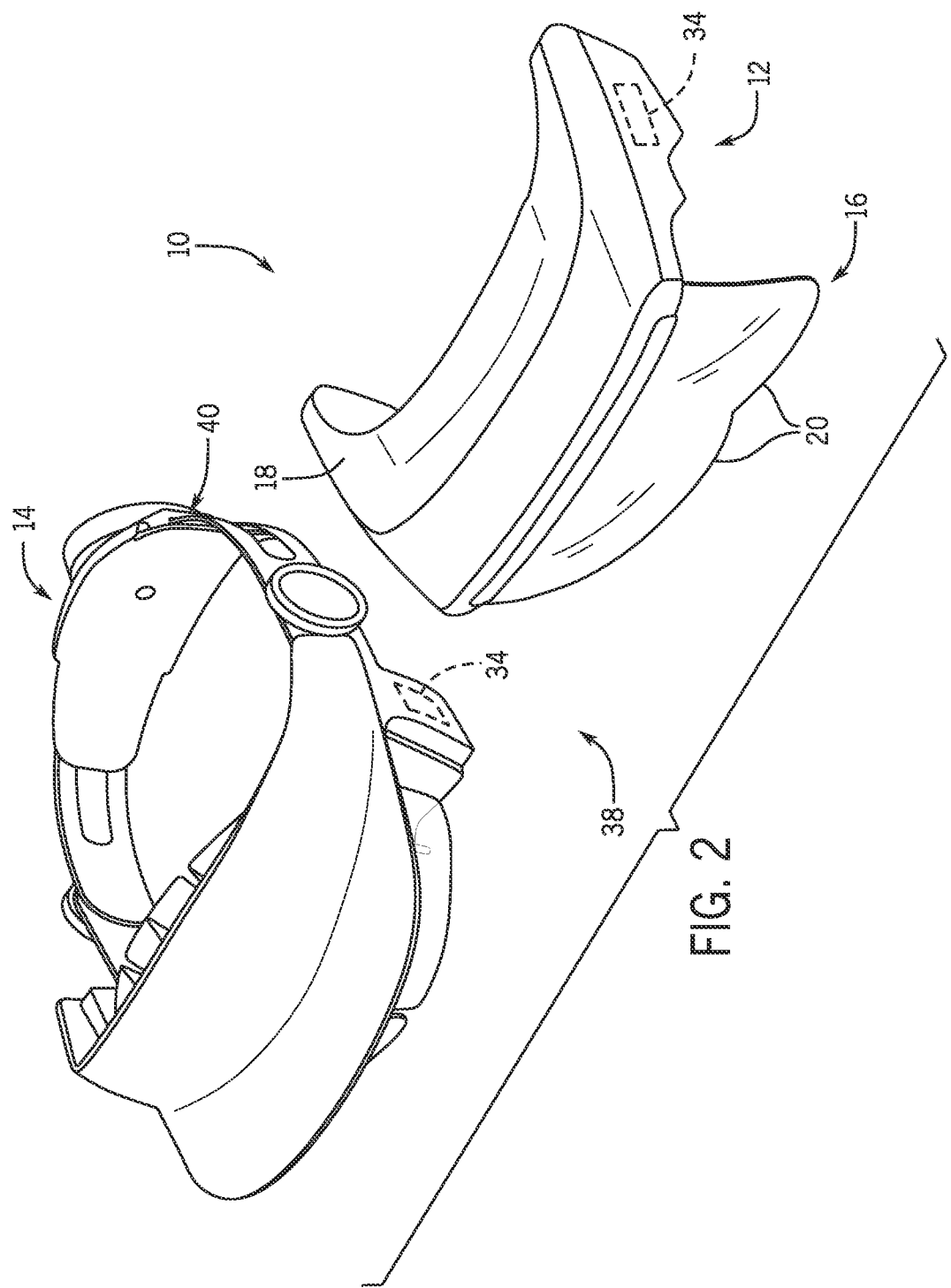
FIG. 2 is a perspective view of the visualization device and the interface device of FIG. 1 in a detached configuration, in accordance with present embodiments.

In an embodiment, the control system 200 may maintain or increase the magnetic coupling force generated by the electromagnets 124 to maintain the electromagnetic coupling system 34 in the locked configuration, and to thereby maintain the visualization device 12 in the engaged configuration 36, during the ride stage of the attraction 172 (e.g., throughout a time period where the ride vehicle 30 travels along the amusement section 218), as indicated by block 216. For example, the control system 200 may energize the electromagnets 124 to generate a target magnetic coupling force (e.g., ride magnetic coupling force) with the reaction plates 74 of the interface device 14. In an embodiment, the target magnetic coupling force may be greater than the magnetic coupling force that is applied upon initial coupling of the visualization device 12 and the interface device 14 and/or greater than the magnetic coupling force while the ride vehicle 30 is in the loading section 178. The magnetic coupling force applied upon initial coupling of the visualization device 12 and the interface device 14 and/or the magnetic coupling force while the ride vehicle 30 is in the loading section 178 may be considered a baseline magnetic coupling force, which may be sufficient to facilitate coupling and/or maintain the engaged configuration 36 while the ride vehicle 30 is stationary. In this manner, the control system 200 may ensure that the visualization device 12 does not detach from the interface device 14 while the ride vehicle 30 travels along the amusement section 218 during a ride cycle of the attraction 172. That is, in the locked configuration of the electromagnetic coupling system 34, a force involved to magnetically decouple the electromagnets 124 and the reaction plates 74, such as when transitioning the visualization device 12 from the engaged configuration 36 (e.g., as shown in FIG. 1) to the detached configuration 38 (e.g., as shown in FIG. 2), may be greater than, for example, a force acting on the visualization device 12 due to gravity, due to shaking or turning of the guest's head, due to inadvertent contact with the visualization device 12, and/or due to accelerative forces acting on the visualization device 12 while the ride vehicle 30 travels along the path 176.

In an embodiment, the magnetic coupling force generated between the electromagnets 124 and the reaction plates 74 may inhibit the user from detaching the visualization device 12 from the interface device 14 while the electromagnetic coupling system 34 is in the locked configuration. Accordingly, in order for the user to remove the visualization device 12 from the head of the user while the ride vehicle 30 travels along the amusement section 218 of the path 176, the user may remove both the visualization device 12 and the interface device 14 as an assembly (e.g., while the visualization device 12 and the interface device 14 are in the engaged configuration 36). In this manner, the electromagnetic coupling system 34 may ensure that both the visualization device 12 and the interface device 14 remain physically (e.g., mechanically) coupled to the ride vehicle 30 throughout a duration of the ride cycle (e.g., via the cable 28 tethered to the visualization device 12).

In an embodiment, the control system 200 may be configured to transiently adjust the magnetic coupling force generated between the electromagnets 124 and the reaction plates 74 while the ride vehicle 30 travels along the path 176 (e.g., along the amusement section 218 of the path 176), such as based on sensor feedback and/or ride data from the ride controller 186, as indicated by block 220. For example, in an embodiment, the one or more sensors 148, 202 may provide the control system 200 with feedback indicative a motion of and/or force (e.g., an accelerative force) applied to the visualization device 12 as the ride vehicle 30 travels along the path 176. The control system 200 may be configured to modulate the magnetic coupling force generated by the electromagnets 124 based on the motion (e.g., velocity) of and/or the force (e.g., a magnitude of the measured accelerative force) applied to the visualization device 12 during the ride cycle. Particularly, the control system 200 may be configured to proportionally increase a magnitude of the magnetic coupling force (e.g., to a first magnetic coupling force; greater than the baseline magnetic coupling force) generated by the electromagnets 124 in response to an increase in the motion of and/or the accelerative force (e.g., as measured by the one or more sensors 148) applied to the visualization device 12 during the ride cycle. Conversely, the control system 200 may be configured to proportionally decrease a magnitude of the magnetic coupling force (e.g., to a second magnetic coupling force less than the first magnetic coupling force and/or the baseline magnetic coupling force) generated by the electromagnets 124 in response to a decrease in the motion of and/or the accelerative force (e.g., as measured by the one or more sensors 148) applied to the visualization device 12 during the ride cycle. In this way, the first magnetic coupling force may be applied as the ride vehicle 30 travels quickly along a steep drop in the path 176 and the second magnetic coupling force may be applied as the ride vehicle 30 travels slowly along a level portion of the path 176, for example.

In an embodiment, the control system 200 may adjust the magnetic coupling force (e.g., a magnitude of the magnetic coupling force) generated by the electromagnets 124 when the electromagnetic coupling system 34 is in the locked configuration based on the attraction 172 in which the AR/VR system 10 is implemented. For example, when the AR/VR system 10 is implemented in a relatively high-speed attraction, the control system 200 may control the electromagnets 124 such that the magnetic coupling force generated by the electromagnets 124 (e.g., when the electromagnetic coupling system 34 is in the locked configuration) is relatively high. Conversely, when the AR/VR system 10 is implemented in a relatively low-speed attraction, the control system 200 may control the electromagnets 124 such that the magnetic coupling force generated by the electromagnets 124 (e.g., when the electromagnetic coupling system 34 is in the locked configuration) is relatively low. To this end, operation of the electromagnetic coupling system 34 may be customized based on the attraction 172 in which the AR/VR system 10 is to be implemented.

During an unloading stage, the control system 200 may operate the electromagnets 124 to selectively disengage the reaction plates 74 to facilitate transitioning the electromagnetic coupling system to an unlocked configuration, to thereby enable the user to transition the visualization device 12 to the detached configuration 38 with the interface device 14, as indicated by block 222. That is, upon determining that the ride vehicle 30 has returned to the loading section 178 (or is in a separate unloading section) during the unloading stage of the ride cycle (e.g., the ride cycle is complete and/or the users have pulled on or attempted to remove their respective visualization device 12), the control system 200 may transition the electromagnetic coupling system 34 to an unlocked configuration (e.g., a state in which the electromagnets 124 are de-energized, transitioned to a low power state, or operated to repel the reaction plates 74). For example, the control system 200 may reduce the magnetic coupling force generated between the electromagnets 124 and the reaction plates 74, may reverse a polarity of the electromagnets 124 to cause the electromagnets 124 to repel the reaction plates 74, or may instruct the electromagnetic coupling system 34 to perform another suitable action during the unloading stage to facilitate decoupling of the visualization device 12 and the interface device 14 as disclosed herein.

Figure 8:
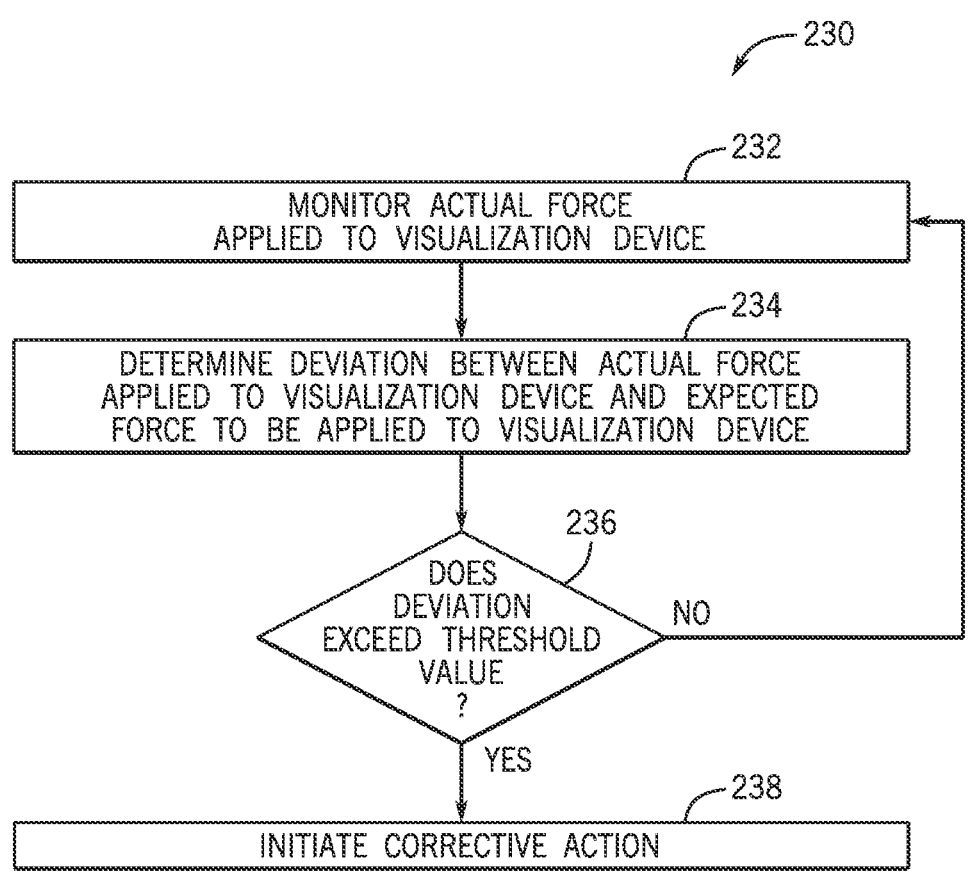
FIG. 8 is a flow diagram of a process for monitoring a force applied to the visualization device during a ride cycle of the attraction of FIG. 6, in accordance with present embodiments.

In an embodiment, the control system 200 may determine whether the user attempts to decouple the visualization device 12 from the interface device 14 during the ride cycle of the attraction 172 based on a force applied to the visualization device 12. FIG. 8 is a flow diagram of an embodiment of the process 230 for controlling the electromagnetic coupling system 34 based on a measured force applied to the visualization device 12. The process 230 includes monitoring, via the one or more sensors 148, an actual force (e.g., accelerative force) applied to the visualization device 12 while the ride vehicle 30 travels along the path 176, as indicated by block 232. An expected force (e.g., accelerative force) applied to the visualization device 12 as the ride vehicle 30 travels along various sections of the path 176 may be known or empirically determined (e.g., via experimental testing).

As indicated by block 234, the control system 200 may determine a deviation between the actual force applied to the visualization device 12 while the ride vehicle 30 travels along a particular section of the path 176 and an expected force that the visualization device 12 is expected to experience while the ride vehicle 30 travels along that same section of the path 176. As indicated by block 236, the control system 200 determines whether the deviation between the actual force and the expected force exceeds a threshold value. If the deviation between the actual force applied to the visualization device 12 and the expected force to be applied to the visualization device 12 exceeds the threshold value, the control system 200 may determine that the user is attempting to forcibly decouple to visualization device 12 from the interface device 14. Upon such a determination, the controller 130 may initiate a corrective action, as indicated by block 238. For example, in an embodiment, initiating a corrective action may include disabling the AR/VR content displayed on the electronic eyeglasses 16, such that the user may no longer be presented with or be able to view any virtual features 24 on the displays 20. Additionally or alternatively, initiating a corrective action may include transitioning the electromagnets 124 to a de-energized state or otherwise reducing the magnetic coupling force, such that the user may decouple (e.g., or more easily decouple) the visualization device 12 from the interface device 14. In an embodiment, the visualization device 12 may include a button 240 (e.g., see FIG. 4) or other contact sensor that, when depressed or contacted by the user, initiates the correction action. Additionally or alternatively, initiating a corrective action may include increasing the magnetic coupling force between the electromagnets 124 and the reaction plates 74, such that the user may not decouple (e.g., or to require more force to decouple) the visualization device 12 from the interface device 14.

The following discussion continues with reference to FIG. 6. In an embodiment, the control system 200 may be configured to adjust the magnetic coupling force generated between the electromagnets 124 and the reaction plates 74 (e.g., when the electromagnetic coupling system 34 is in the locked configuration) based on one or more characteristics (e.g., parameters) and/or preferences of the user currently utilizing the visualization device 12. For example, in an embodiment, the control system 200 may instruct the electromagnets 124 to generate a first threshold or target magnetic coupling force (e.g., a relatively high magnetic coupling force) upon identification of the user as an adult user, and may instruct the electromagnets 124 to generate a second threshold or target magnetic coupling force (e.g., a relatively low magnetic coupling force), upon identification of the guest as a child user. As such, the control system 200 may adjust a force that may be involved to magnetically decouple the visualization device 12 from the interface device 14 based on characteristics of the user utilizing the AR/VR system 10.

In an embodiment, the control system 200 may identify the characteristics (e.g., adult, child) of user utilizing the visualization device based on feedback received from a weight sensor 242 (e.g., a load cell) that may be coupled to a seat 244 of the ride vehicle 30. For example, the control system 200 may evaluate the feedback received by the weight sensor 242 upon boarding of the user into the ride vehicle 30 and seating of the user on the seat 244 (e.g., while the ride vehicle 30 is in the loading section 178). If the feedback received by the control system 200 indicates that the weight of the user is above a first threshold value, the control system 200 may identify the user as an adult user and control the electromagnets 124 to generate the first threshold or target magnetic coupling force (e.g., a relatively high coupling force) when the electromagnetic coupling system 34 is in the locked configuration. If the feedback received by the control system 200 indicates that the weight of the user is below the threshold value, the control system 200 may identify the user as a child user and control the electromagnets 124 to generate the second threshold or target magnetic coupling force (e.g., a relatively low coupling force) when the electromagnetic coupling system 34 is in the locked configuration. Other variations in the magnetic coupling force at various times based on the characteristics of the user are also envisioned. For example, the magnetic coupling force in the unlocked configuration during the unloading stage may be greater for an adult than for a child to thereby make it easier for the child to separate the visualization device 12 from the interface device 14. Furthermore, the magnetic coupling force to pull the visualization device 12 and the interface device 14 together during the loading stage may be less for the adult than for the child to thereby provide more assistance to the child to join the visualization device 12 to the interface device 14.

In an embodiment, the control system 200 may utilize feedback from other sensors of the attraction 172 and/or the visualization device 12 in addition to, or in lieu of, the weight sensor 242, to identify the characteristics of the guest utilizing the visualization device 12. As a non-limiting example, the attraction 172 may include a machine vision system 246 having a camera 247 that is configured to acquire images of the user. The machine vision system 246 may be communicatively coupled to the control system 200 and may analyze the image data acquired by the camera 247 to derive biometric data of a particular user utilizing the visualization device 12 to categorize the user as an adult user or a child user. The machine vision system 246 may be coupled to the ride vehicle 30 or may be positioned at a suitable location along the platform 180. In an embodiment, the machine vision system 246 may include one or more cameras 248 (see, e.g., FIG. 3) that are integrated with the visualization device 12 and configured to acquire image data of a face of the user when the visualization device 12 positioned on interface device 14 and/or near the head of the user. The machine vision system 246 may utilize image data acquired by the cameras 248 to categorize a user as, for example, an adult user or a child user in accordance with the techniques discussed above. It should be appreciated that the control system 200 may receive the characteristics and/or preferences related to the magnetic coupling force via an input by the user, an operator of the attraction 172, a radiofrequency identification device carried by the user and readable by a reader that is communicatively coupled to the control system 200, and/or any other suitable technique.

Figure 9:
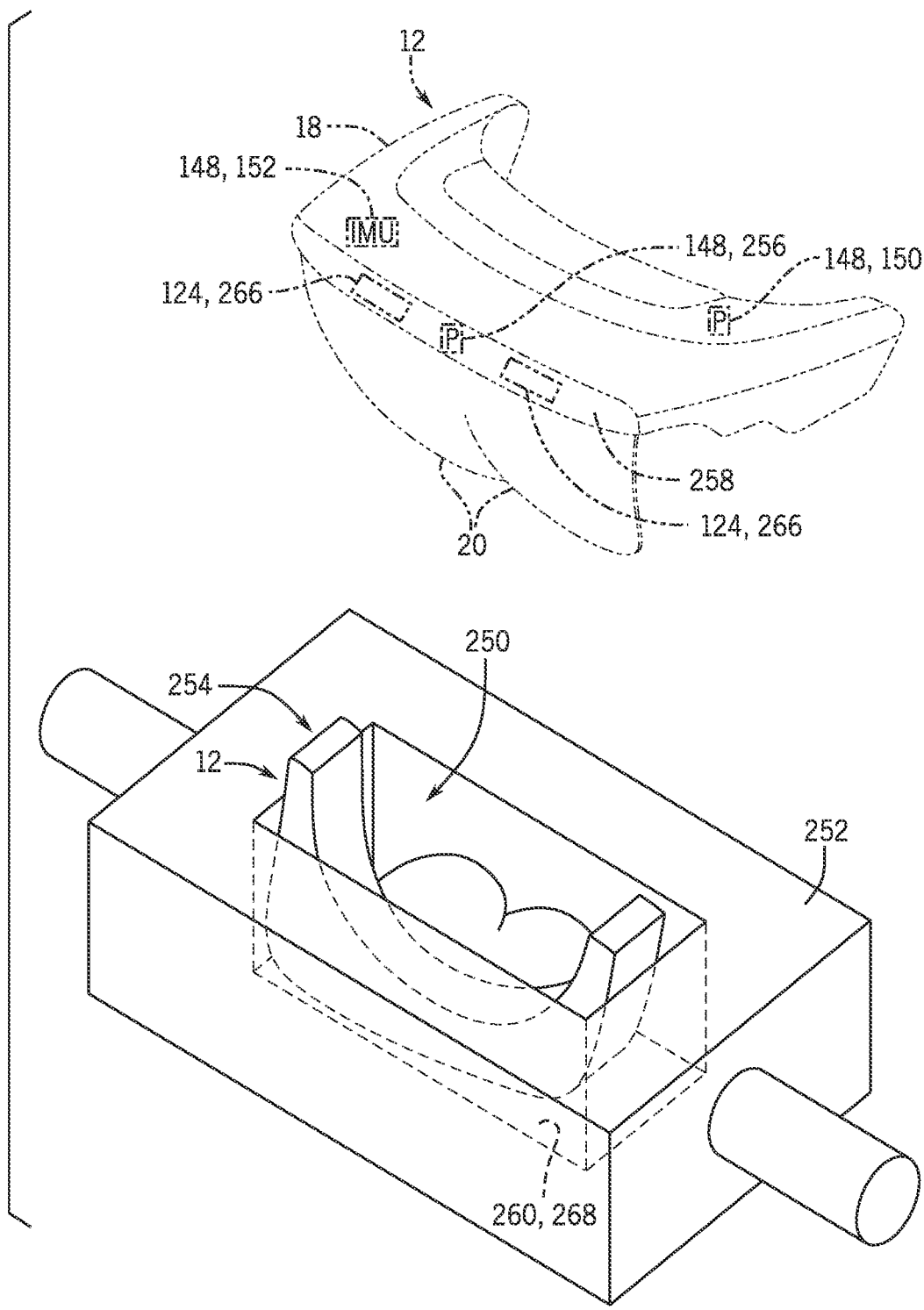
FIG. 9 is a perspective view of a storage receptacle and the visualization device of FIG. 1 in a storage configuration within the storage receptacle, in accordance with present embodiments.

FIG. 9 is a perspective view of an embodiment of the visualization device 12 and a receptacle 250 (e.g., storage receptacle) configured to receive the visualization device 12. In an embodiment, the visualization device 12 may be stored in the receptacle 250 when the visualization device 12 is not fitted on the interface device 14 of a guest (e.g., a passenger of the ride vehicle 30). By way of example, the receptacle 250 may include a cavity or other storage region formed within a lap bar 252 or other restraint of the ride vehicle 30. In an embodiment, the control system 200 may be configured to utilize feedback from one or more sensors, such as from the proximity sensor 150 and/or the IMU 152 (e.g., an orientation sensor), to determine whether the visualization device 12 is in a storage configuration 254 within in the receptacle 250.

For example, the IMU 152 may include a nine degree of freedom system on a chip equipped with accelerometers, gyroscopes, a magnetometer, and/or a processor for executing sensor fusion algorithms. The control system 200 may utilize feedback received from the IMU 152 to determine an orientation of the visualization device 12 (e.g., relative to a direction of gravity) along various axes. In an embodiment, an orientation, referred to herein as a storage orientation, of the visualization device 12, when the visualization device 12 is positioned in the receptacle 250, may be known and stored on, for example, the memories 134 and/or 190.

The control system 200 may determine that the visualization device 12 is in the storage configuration 254 upon receiving feedback from the IMU 152 that the visualization device 12 is in the storage orientation and/or upon receiving feedback from a proximity sensor 256 (e.g., the proximity sensor 150) that, for example, a lens mount 258 of the visualization device 12 is a threshold distance away from a mating surface 260 of the receptacle 250 or in contact with the mating surface 260. In an embodiment, an event or action may occur in response to the visualization device 12 being in the storage configuration 254. For example, the lap bar 252 or other restraint may move (e.g., release) in response to the visualization device 12 being in the storage configuration 254. It should be appreciated that the receptacle 250 may be positioned in any suitable portion of the ride vehicle (e.g., dashboard, arm rest, wall).

In an embodiment, the visualization device 12 includes a plurality of frontal electromagnets 266 (e.g., a subset of the electromagnets 124, additional electromagnets) that are positioned along the lens mount 258. The frontal electromagnets 266 may be configured to magnetically couple the visualization device 12 to a reaction surface 268 (e.g., a metallic plate, one or more permanent magnets, the mating surface 260) when the visualization device 12 is in the storage configuration 254. For example, upon determining that the user has transitioned the visualization device 12 to the storage configuration 254, the control system 200 may transition the frontal electromagnets 266 to an energized state to secure the visualization device 12 in the receptacle 250.

In an embodiment, the control system 200 may operate the frontal electromagnets 266 to vary the magnetic coupling force between the frontal electromagnets 266 and the reaction surface 268 at various portions or stages of the ride cycle. For example, the magnetic coupling force may be relatively low while the ride vehicle 30 is positioned along the loading section 178 of the path 176 during a loading stage (e.g., as the user enters the ride vehicle 30). As such, the user boarding the ride vehicle 30 may grab the visualization device 12 in the receptacle 250, apply sufficient force to the visualization device 12 to magnetically decouple the frontal electromagnets 266 from the reaction surface 268, and couple to visualization device 12 to the interface device 14 in accordance with the techniques discussed above. The magnetic coupling force may be relatively high while the ride vehicle 30 is positioned along the loading section 178 of the path 176 during an unloading stage (e.g., such that the frontal electromagnets 266 may firmly engage the reaction surface 268 after the user decouples the visualization device 12 from the interface device 14 of the user and places the visualization device 12 in the receptacle 250).

In an embodiment, if the control system 200 determines that the visualization device 12 is not being used by the user during a particular ride cycle or a particular portion of the ride cycle of the attraction 172 (e.g., due to an empty seat), the control system 200 may adjust operation of the frontal electromagnets 266 to generate the magnetic coupling force between the frontal electromagnets 266 and the reaction surface 268. As such, the control system 200 may ensure that the visualization device 12 remains positioned within the receptacle 250 during execution of the ride cycle of the attraction 172 and does not become dislodged from the receptacle 250 due to accelerative forces that may be applied to the visualization device 12 throughout the ride cycle.

The control system 200 may determine that the visualization device 12 is not being used by the user during a particular ride cycle of the attraction 172 upon receiving feedback from the proximity sensor 256 indicating that the visualization device 12 is still within the receptacle 250 at the end of a designated boarding time of the ride vehicle 30 or that the visualization device 12 is still within the receptacle 250 when the ride vehicle 30 exits the loading section 178, for example. Additionally or alternatively, control system 200 may determine that the visualization device 12 is not being used by the user during a particular ride cycle of the attraction 172 upon receiving feedback from the weight sensor 242 and/or the machine vision system 246 indicating that the seat 244 corresponding to the visualization device 12 is unoccupied, for example.

It should be appreciated that electromagnets 124 that are used to couple the visualization device 12 to the interface device 14 may be used to hold the visualization device 12 within the receptacle 250 in addition to or as an alternative to the frontal electromagnets 266. Furthermore, the interface device 14 and/or the receptacle 250 may include the electromagnets, and the visualization device 12 may include the reaction material. Additionally, it should be appreciated that any of the features discussed with reference to FIGS. 1-9 may be combined in any suitable manner.

As set forth above, embodiments of the present disclosure may provide one or more technical effects useful for facilitating quick and comfortable securement of a visualization device to an interface device of a user. Moreover, the embodiments of the present disclosure facilitate selectively retaining the visualization device in an engaged configuration (e.g., a coupled configuration, a locked configuration) with the interface device during certain time periods, such as during a ride cycle of an amusement park attraction. It should be understood that the technical effects and technical problems in the specification are examples and are not limiting. Indeed, it should be noted that the embodiments described in the specification may have other technical effects and can solve other technical problems.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. § 112(f).

The invention claimed is:

1. A method of operating an augmented reality, virtual reality, and/or mixed reality (AR/VR) system, the method comprising:
   generating, via a sensor, feedback indicative of a position of a visualization device relative to an interface device, wherein the visualization device is configured to engage with the interface device, and wherein the interface device is configured to be worn by a user;
   monitoring, via a controller, the position of the visualization device relative to the interface device;
   transitioning, via the controller, an electromagnet of the visualization device from a de-energized state to an energized state based on the position of the visualization device indicating that the visualization device is within a threshold angle relative to the interface device; and
   adjusting, via the controller, operation of the electromagnet of the visualization device to modulate a magnetic coupling force between the electromagnet and a reaction material of the interface device based on the position of the visualization device relative to the interface device.

2. The method of claim 1, comprising transitioning the electromagnet from the de-energized state to the energized state in response to the position of the visualization device relative to the interface device indicating that the visualization device is within a threshold distance of the interface device.

3. The method of claim 1, wherein the sensor is disposed on the visualization device.

4. An augmented reality, virtual reality, and/or mixed reality (AR/VR) system, comprising:
   a ride vehicle configured to travel along a path during a ride stage of a ride cycle, wherein the ride stage occurs between a loading stage of the ride cycle and an unloading stage of the ride cycle;
   a visualization device coupled the ride vehicle via a tether and configured to display virtual features for visualization by a user of the visualization device, wherein the visualization device comprises an electromagnet;
   an interface device configured to be worn by the user and to engage with the visualization device, wherein the interface device comprises a frame supporting a reaction material;
   a controller electrically coupled to the electromagnet, wherein the electromagnet is configured to magnetically couple to the reaction material and the controller is configured to adjust operation of the electromagnet to modulate a magnetic coupling force between the electromagnet and the reaction material, and wherein the controller is configured to energize, based on a determination that the ride vehicle executes the ride stage, the electromagnet to lock the visualization device and the interface device together via the electromagnet for a duration of the ride stage; and
   a location sensor communicatively coupled to the controller and configured to provide the controller with feedback indicative of a location of the ride vehicle along a path, wherein the controller is configured to adjust the magnetic coupling force based on the location of the ride vehicle along the path.

5. The AR/VR system of claim 4, wherein the ride vehicle comprises a restraint including a receptacle and a reaction surface, wherein the receptacle is configured to receive the visualization device, wherein the visualization device comprises an additional electromagnet electrically coupled to the controller, and wherein the controller is configured to adjust operation of the additional electromagnet to modulate an additional magnetic coupling force between the additional electromagnet and the reaction surface in coordination with the ride cycle of the ride vehicle.

6. The AR/VR system of claim 4, comprising a force sensor coupled to the visualization device and configured to provide feedback indicative of a force applied to the visualization device, wherein the controller is configured to disable presentation of the virtual features via the visualization device in response to determining that the user is attempting to decouple the visualization device from the interface device during the ride cycle.

7. The AR/VR system of claim 4, wherein the controller is configured to de-energize the electromagnet during the unloading stage.

8. The AR/VR system of claim 7, comprising a force sensor coupled to the visualization device and configured to provide feedback indicative of a force applied to the visualization device, wherein the controller is configured to de-energize the electromagnet in response to determining that the user is attempting to decouple the visualization device from the interface device during the unloading stage.

* * * * *